United States Patent
Kullen et al.

(10) Patent No.: US 9,772,046 B2
(45) Date of Patent: Sep. 26, 2017

(54) METHOD AND APPARATUS FOR MOUNTING A CONTROL VALVE POSITIONER

(71) Applicant: Badger Meter, Inc., Milwaukee, WI (US)

(72) Inventors: Julian Marcel Kullen, Neuffen (DE); Rainer Windeisen, Lorch (DE)

(73) Assignee: Badger Meter, Inc., Milwaukee, WI (US)

( * ) Notice: Subject to any disclaimer, the term of this patent is extended or adjusted under 35 U.S.C. 154(b) by 91 days.

(21) Appl. No.: 14/097,989

(22) Filed: Dec. 5, 2013

(65) Prior Publication Data

US 2015/0159772 A1 Jun. 11, 2015

(51) Int. Cl.
F16K 37/00 (2006.01)
F16K 31/126 (2006.01)

(52) U.S. Cl.
CPC ...... *F16K 31/1262* (2013.01); *F16K 37/0008* (2013.01); *F16K 37/0016* (2013.01); *Y10T 137/8225* (2015.04); *Y10T 137/8242* (2015.04); *Y10T 137/8275* (2015.04); *Y10T 137/8292* (2015.04)

(58) Field of Classification Search
CPC ............ F16K 37/0008; F16K 37/0016; Y10T 137/8242; Y10T 137/8225; Y10T 137/8275; Y10T 137/8292
USPC ............................. 137/553, 556, 554, 556.3
See application file for complete search history.

(56) References Cited

U.S. PATENT DOCUMENTS

| | | | | |
|---|---|---|---|---|
| 3,824,901 A | * | 7/1974 | Shafer | F16K 31/1635 92/128 |
| 4,338,965 A | * | 7/1982 | Garnjost | F15B 20/001 137/554 |
| 4,625,758 A | * | 12/1986 | Murray | F16K 31/502 137/554 |
| 4,715,580 A | * | 12/1987 | Mueller | F16H 25/20 251/129.12 |
| 4,771,807 A | * | 9/1988 | Karani | F16K 31/05 137/553 |
| 4,836,974 A | * | 6/1989 | Ezekoye | F16K 37/0008 116/277 |
| 5,329,465 A | * | 7/1994 | Arcella | G07C 3/00 137/554 |
| 5,329,956 A | * | 7/1994 | Marriott | F16K 17/04 137/15.01 |
| 6,135,147 A | * | 10/2000 | Peters | F16K 37/0008 137/552 |
| 6,776,389 B2 | * | 8/2004 | Ito | 251/129.04 |
| 7,219,691 B2 | | 5/2007 | Gethmann et al. | |

(Continued)

FOREIGN PATENT DOCUMENTS

JP H10299940 A 11/1998
JP H11125201 A 5/1999

(Continued)

*Primary Examiner* — Atif Chaudry
(74) *Attorney, Agent, or Firm* — Boyle Fredrickson, S.C.

(57) ABSTRACT

A control valve positioner mounting system is configured to include a control valve, a control valve positioner, an attachment lever translating movement of the control valve to the control valve positioner, and a control valve attachment system for attaching the control valve to the attachment lever using a spring loaded attachment affixed to the control valve and applying spring force to the attachment lever.

15 Claims, 4 Drawing Sheets

(56) References Cited

U.S. PATENT DOCUMENTS

| | | | | |
|---|---|---|---|---|
| 7,609,056 B2* | 10/2009 | Junk et al. | ............... | 324/207.25 |
| 8,036,837 B2* | 10/2011 | Wilke | ................ | F16K 37/0091 |
| | | | | 702/35 |
| 8,417,468 B2 | 4/2013 | Wilke | | |
| 8,474,789 B2* | 7/2013 | Shimada | ............... | F16K 31/047 |
| | | | | 137/554 |
| 8,925,895 B2* | 1/2015 | Takemoto | ............. | F15B 19/005 |
| | | | | 137/554 |

FOREIGN PATENT DOCUMENTS

| | | |
|---|---|---|
| KR | 200388450 Y1 | 6/2005 |
| KR | 100713086 B1 | 4/2007 |

* cited by examiner

METHOD AND APPARATUS FOR MOUNTING A CONTROL VALVE POSITIONER

FIELD OF THE INVENTION

This application relates to a mounting kit for attaching a control valve positioner to a control valve stem, in particular to a system for attaching the control valve positioner to the control stem using a closed spring force circuit that applies the spring force to the attachment arm.

BACKGROUND

A control valve is typically used to control the flow of liquids, gas and steam in a variety of industrial applications including chemical, petrochemical, bio-tech, food and beverage, pharmaceutical, general industrial, and research applications. Control valves may be configured in a variety of different ways to provide precision control for the wide variety of applications. Typical control valve designs range from ¼ to 2 inch flow channels; handle pressures from vacuum to 60,000 PSI; handle temperatures from cryogenic to 1500° F., and control the flow of a wide selection of materials. Although typical control valves are described above, custom control valves can be configured from most any application.

Typical control valves are driven by a pneumatic actuator, referred to herein as a control valve actuator. The control valve actuators control the volume of liquid and/or gas flowing through the control valve based on a control signal received at the actuator. Accordingly, control valves may be controlled to provide greater or lesser flow volumes based on a current demand, based on a desired flow volume, etc.

In operation, control valves may experience a difference between a set flow volume, representing a desired flow volume and the actual flow volume allowed by the control valve. The deviations may be corrected for using control valve positioners.

Control valve positioners are used to avoid the influence of forces such as friction and/or differential pressures that can affect the valve position. These forces typically are created from different pressures in the valve itself.

A control valve positioner relates the input signal indicating a measured flow volume to the valve position representing the desired flow volume, and will provide a signal to the control valve actuator to correct for deviations in the two values. The control valve positioner is usually fitted to a yoke or pillars of the actuator, and it is linked to a spindle of the actuator by a feedback arm in order to monitor the valve position. The control valve positioner measures the actual stroke of the valve and compares it with a set point received from an external device. Depending on the actual stroke and the signal the positioner creates a pneumatic signal to the control valve actuator. Typically, the actual stroke is measured with a lever with a rotating connection to the positioner. Thus, the linear movement of the valve stem is translated to a rotating movement in the positioner.

Typical mounting kits use a spring, either internal or external, to maintain the lever on the control valve stem. However, these springs can induce forces into the valve stem system. Further, erosion of materials in the connection point caused by the constant movement of the valve stem can cause drifting in the position values measured by the control valve positioner.

Accordingly, there remains a need for a control valve positioner mounting that does not introduce additional forces to the valve stem system. There further remains a need for such a mounting that compensates for erosion of materials caused by the constant movement of the valve stem.

SUMMARY OF THE INVENTION

The invention provides a system and method for attaching a control valve positioner to a control valve stem, in particular to a system for attaching the control valve positioner to the control stem using a closed spring force circuit that applies the spring force to an attachment arm. The closed spring three circuit applied to spring force to minimize or negate transference of spring force to the control valve stem.

According to one exemplary embodiment, a control valve positioner mounting system is configured to include a control valve, a control valve positioner, an attachment lever translating movement of the control valve to the control valve positioner, and a control valve attachment system for attaching the control valve to the attachment lever using a spring loaded attachment affixed to the control valve and applying spring force to the attachment lever.

The spring loaded attachment may include a pair of bushings positioned on opposing sides of the attachment lever, where the spring force is applied to the attachment lever by one of the pair of bushings is biased in the direction of the bushing on the opposing side. Further, the spring force may be applied in a closed force circuit by anchoring a spring applying the spring force such that the spring force the applied to the attachment lever.

According to another variation, the attachment lever includes a pair of parallel bars and the pair of bushings are mounted to a bushing support bar positioned between the parallel bars. The bushing support bar may be slidably mounted between the parallel bars such that the bushing support bar can slide along the length of the attachment lever, where each bushing of the pair of bushings includes a sloping face on a face proximate to the opposing bushing such that the spring force applied to the parallel bars is consistent independent of wear on the pair of bushings.

According to another variation, the material forming the pair of bushings is electrically neutral to avoid sparking. One such material may be Teflon.

According to one exemplary embodiment, a control valve positioner mounting system is configured to include a control valve, a control valve positioner, an attachment lever including a pair of parallel bar arms translating movement of the control valve to the control valve positioner, and a control valve attachment system for attaching the control valve to the attachment lever using a spring loaded attachment affixed to the control valve and applying spring force to the parallel bar arms of the attachment lever wherein the force applied to a first parallel bar arm is the same as the force applied to a second parallel bar arm.

Other features of the invention, besides those discussed above, will be apparent to those of ordinary skill in the art from the description of the preferred embodiments which follows. In the description, reference is made to the accompanying drawings, which form a part hereof, and which illustrate examples of the invention. Such examples are illustrative, but for the scope of the invention, reference is made to the claims which follow the description.

DETAILED DESCRIPTION OF THE INVENTION

Figure 1:
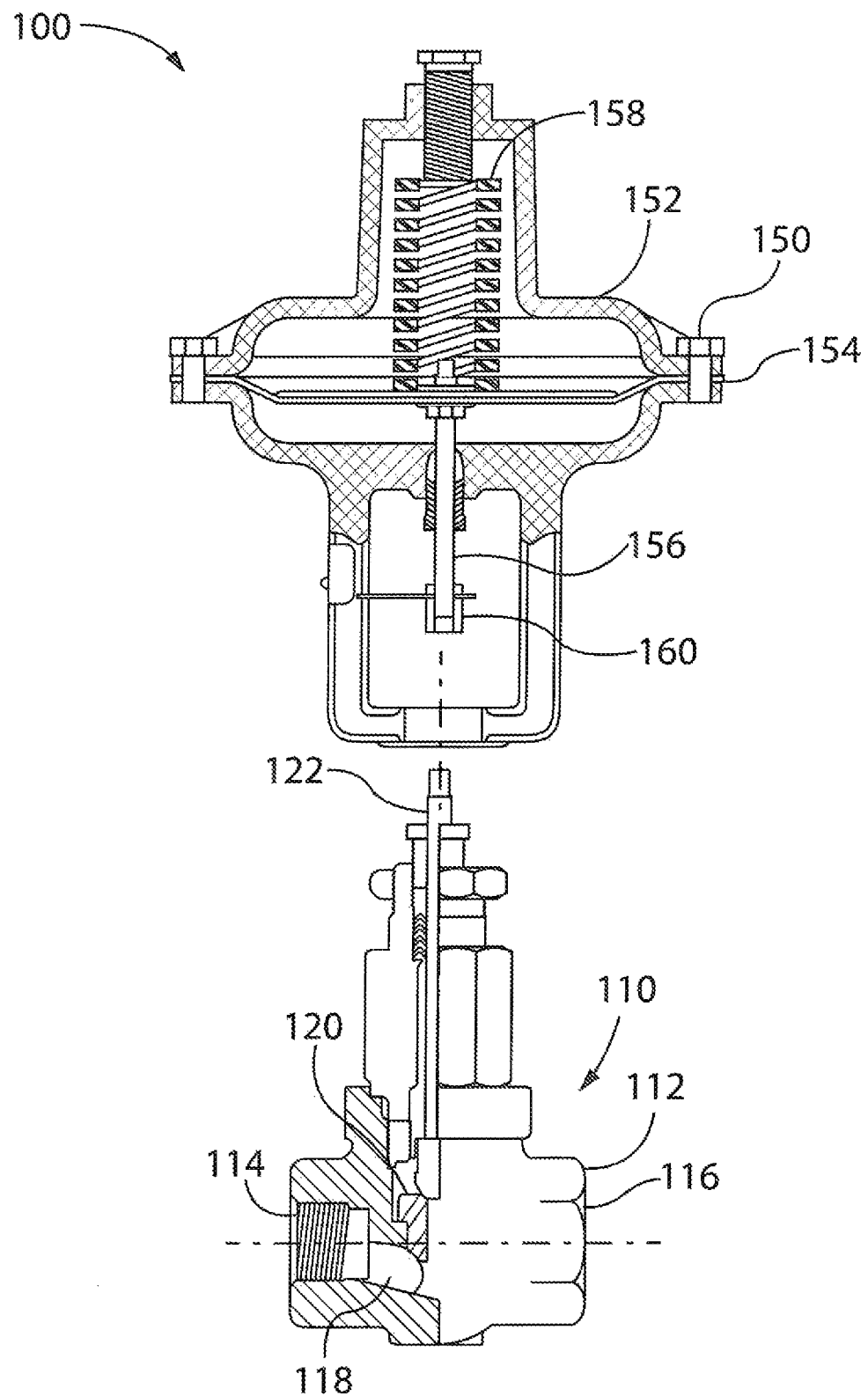
FIG. 1 is an exploded view of a sliding stem control valve assembly, according to an exemplary embodiment.

Referring to FIG. 1, a control valve assembly 100 including a control valve 110 and a control valve actuator 150 is shown, according to an exemplary embodiment. Although a specific control valve 110 and a specific control valve actuator 150 are illustrated as an exemplary valve assembly 100, the specific type and configuration of control valve 110 and control valve actuator 150 can vary.

The control valve 110 may be one that is commercially distributed by Badger Meter, Inc., the assignee of the present invention. An example is the Model 9000 valve, a globe style valve with bolted bonnet and post guided innervalve designed for modulating control of liquids and vapors in medium duty industrial applications such as chemical plants, pulp paper and textile mills, refineries and other industries.

Control valve 110 includes a housing 112 having an inlet port 114, an outlet port 116 and a flow channel 118 for transporting a liquid and/or gas between inlet port 114 and outlet port 116. Control valve 110 further includes a metering valve 120 positioned in the flow channel 118 to control the flow volume passing between the inlet port 114 and the outlet port 116.

The metering valve 120 may be implemented as a sliding stem type control valve, a rotary valve, a butterfly valve, etc. The metering valve 120 is controlled via manipulation of a control valve stem 122 connected by mechanical coupling to the metering valve 120. For example, wherein control valve 110 is a sliding stem type valve, movement of the control valve stem 122 towards and away from the flow channel 118 may be utilized to control the flow volume.

Control valve actuator 150 is a device configured to accurately locate the metering valve 120 in a position dictated by a control signal by manipulation of the control valve stem 122. The control valve actuator 150 may be implemented as a pneumatic or electric actuator although the present application will describe the control valve actuator with reference to a pneumatic actuator. The actuator 150 accepts a signal from a control system (not shown) and, in response, moves the valve 110 to a fully-open or fully-closed position, or a more open or a more closed position (depending on whether 'on/off' or 'continuous' control action is used). Control valve actuators 150 may be piston actuators, diaphragm actuators, reverse acting actuators, direct acting actuators, etc., although actuator 150 is shown and described herein as a diaphragm actuator.

Actuator 150 includes a housing 152 holding a diaphragm 154 coupled to an actuator stem 156 and configured to maintain the actuator stem 156 in a neutral position by a return spring 158 in an unloaded position. In operation, diaphragm actuators have compressed air or a fluid applied to diaphragm 154 to displace the actuator stem 156 from the neutral position and loading the return spring 158. The compressed air is typically applied to a single side of the diaphragm 154. Return spring 158 may be configured as one of a direct acting (spring-to-retract) or reverse acting (spring-to-extend) spring. The diaphragm and the actuator stem 156 may be connected to the control valve stem 122 such that the control valve stem 122 is held in a default position such as open, closed, neutral, etc. when the diaphragm 154 is in the unloaded position.

Many forces act on the control valve stem 122 and control valve 120, including for example spring forces from the spring 158, fluid forces, and frictional forces. It is understood that valves and their associated forces are well known in the art and that the above description is merely representative of many different types of forces. These forces may cause a deviation between a set value of the control valve 120 and an actual position of the valve and/or a deviation between a set value of the flow volume and an actual flow volume.

Figure 4:
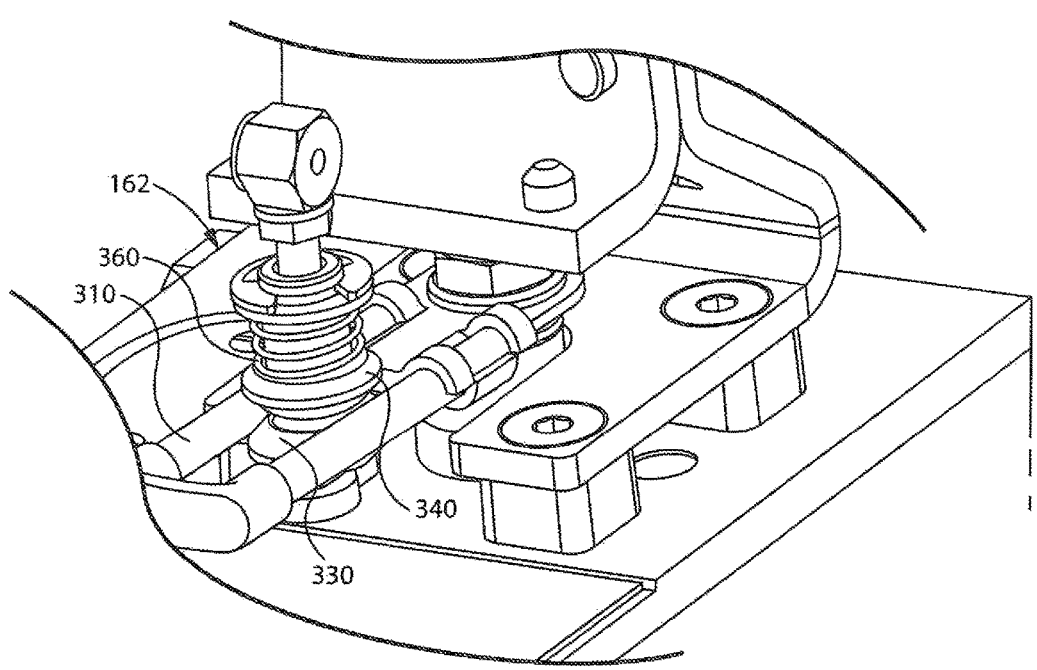
FIG. 4 is a second perspective of the mounting kit of FIG. 4, shown in situ, according to an exemplary embodiment.

Accordingly, control valve assembly 100 further includes a positioner 160 to correct for the deviations between a set position and an actual position of the control valve 120. Referring now to FIGS. 4 and 5, it will be noted that the positioner 160 includes a sliding assembly 162. The sliding assembly 162 is configured to determine the relative position of the actuator stem 156. In turn, the position of the control valve 120 is determined and if the control valve 120 is not positioned appropriately, a corresponding correction signal can be generated by the positioner 160. The correction signal is then used to adjust the pressure differential in the actuator 150 to position the control valve 120 as desired.

Figure 2:
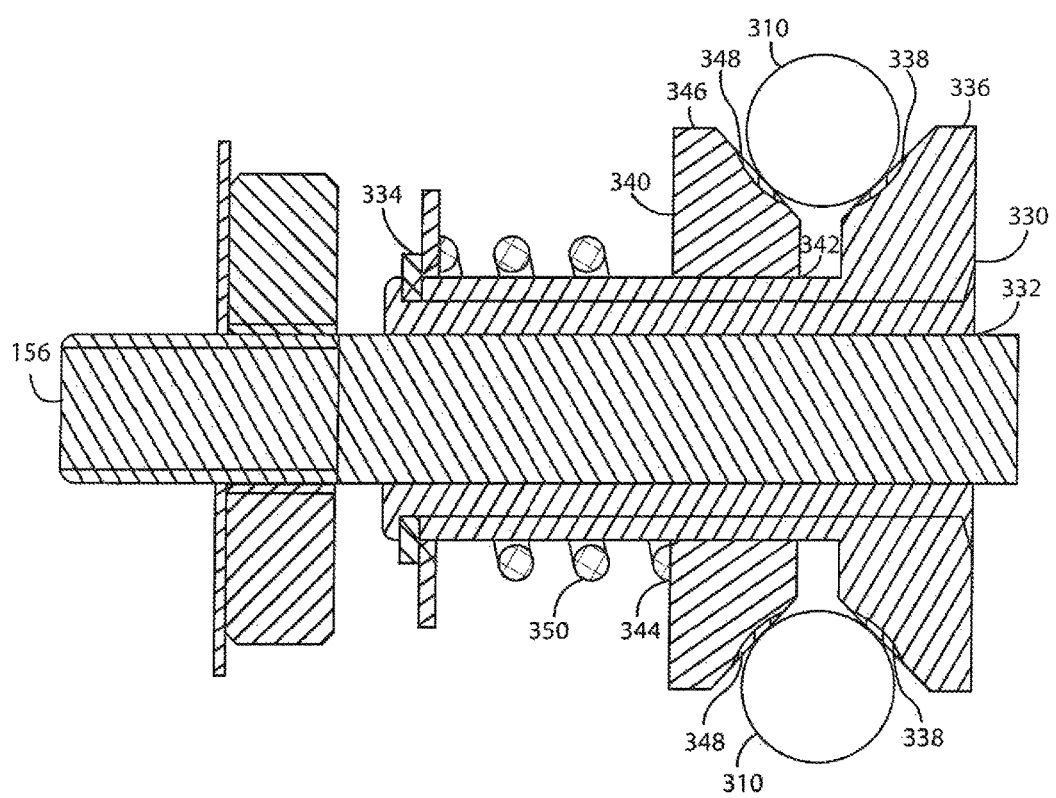
FIG. 2 is a cut away diagram illustrating a mounting kit for mounting an attachment lever to an actuator stem of the control valve actuator, shown in FIG. 1, according to an exemplary embodiment.
Figure 3:
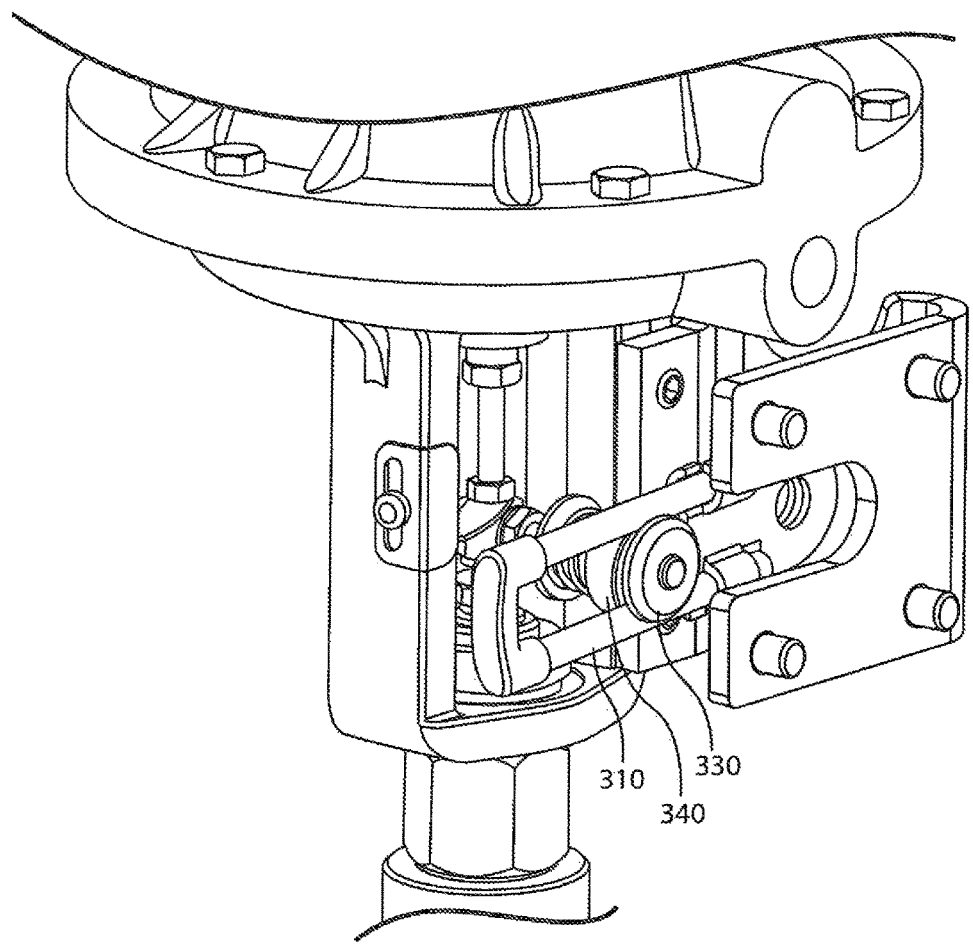
FIG. 3 is a first perspective of the mounting kit of FIG. 3, shown in situ, according to an exemplary embodiment.

Referring now to FIG. 2, a cut away diagram illustrating a mounting kit 300 for mounting an attachment lever 310 to an actuator stem 156 of the control valve actuator 150, shown in FIG. 1. FIGS. 3 and 4 show the mounting kit 300 in situ and using different perspective views for illustrative purposes. The mounting kit 300 affixes the positioner 160 to the actuator stem 156 to allow the positioner to adjust the position of the actuator stem 156 and correspondingly, adjust the control valve 120 to adjust the flow volume through the control valve 110.

Mounting kit 300 includes a pair of bushings 320, including an inner bushing 330 and an outer bushing 340, and a compression spring 350 configured to bias together the two bushings of the pair of bushings 320 as described in detail below. The pair of bushings 320 are configured such that the inner bushing 330 includes a central aperture 332 configured to be slidably mounted over the actuator stem 156 such that the actuator stem 156 is enclosed within the inner bushing 330. The length of the inner bushing 330 is configured such that the pair of bushings 320 can slide easily along the actuator stem 156. According to exemplary embodiment, the cross-section of the central aperture 332 is such that the actuator stem 156 can slide easily within the inner bushing 330 to create a sliding area such that any forces that are transferable between actuator stem 156 and the pair of bushings 320 are minimized.

Inner bushing 330 further includes a spring anchor 334 positioned at a first end of the inner bushing 330, and an attachment lever interface 336 positioned at a second, opposite end of the inner bushing 330. Spring anchor 334 is configured to provide a seat against which a first end of the spring 350 presses. In operation, the spring 350, seated on spring anchor 334, biases the outer bushing 340 away from the first end of the inner bushing 330 and spring anchor 334 towards the second, opposite end of the inner bushing 330 and the attachment lever interface 336. The spring anchor 334 is configured such that spring force generated by the spring 350 are transferred between the spring anchor 334 and outer bushing 340, and such that spring forces transferred to the actuator stem 156 are minimized or eliminated.

Outer bushing 340 also includes an aperture 342 that is greater in diameter than the width of the actuator stem 156 and the inner bushing 330 such that outer bushing 340 is slidably mounted over both of actuator stem 156 and the inner bushing 330. Similar to inner bushing 330, the cross-section of the central aperture 312 is such that the actuator stem 156 and inner bushing 330 can slide easily within central aperture 342 of the outer bushing 340.

Outer bushing 340 further includes a spring anchor 344 positioned at a first end of the outer bushing 340, and an attachment lever interface 346 positioned at a second, opposite end of the outer bushing 340. Spring anchor 344 is configured receive a second end of the spring 350 opposite the end proximate the spring anchor 334. In operation, the spring 350, pressing against spring anchor 344, biases the attachment lever interface 346 of outer bushing 340 towards the attachment lever interface 336 of inner busing 330.

Attachment lever interfaces 336 and 346 and configured to seat against attachment lever 310. Attachment lever interfaces 336 and 346 are pressed together and see attachment lever 310 by the spring force is generated by spring 350 to attach the attachment lever 310 to actuator stem 156.

Attachment lever interfaces 336 and 346 include corresponding abrasion areas 338 and 348, respectively. During normal operation, movement of the actuator stem 156 and the mounting kit 300 will cause wearing in the pair of bushings 320, represented by the abrasion areas 338 and 348. Advantageously, attachment lever interfaces 336 and 346 include sloping faces configured to mate with the attachment lever 310 such that the compression spring forces generated by spring 350 will provide consistent attachment to attachment lever 310 during operation of the pair of bushings 320. In operation, the abrasion, represented by abrasion areas 338 and 348, is consistent both over and under the axis of the actuator stem 156 such that the position of the attachment lever 310 remains consistent even with increasing abrasion.

According to exemplary embodiment, the pair of bushings 320 may be formed from a material having a low coefficient of friction. One exemplary material providing the low coefficient of friction is Teflon although one of ordinary skill in the art would appreciate a variety of materials that are suitable. Advantageously, Teflon facilitates sliding of the pair of bushings along actuator stein 156 and further between inner bushing 330 and outer bushing 340. Additionally, Teflon is electrically neutral to avoid sparking caused by movement between the pair of bushings 320 and attachment arm 310.

Particular configuration of bushings and attachment lever 310 can be vary and still provide advantages described herein. For example attachment lever 310 is shown as a pair of parallel bars, but alternative configurations may include a single bar attachment lever. In such a configuration, the type of bushings used in the pair of bushings 320 may be modified to properly seat against the single bar attachment arm 310 without negating the advantages described herein.

This has been a description of the preferred embodiments, but it will be apparent to those of ordinary skill in the art that variations may be made in the details of these specific embodiments without departing from the scope and spirit of the present invention, and that such variations are intended to be encompassed by the following claims.

We claim:

1. A control valve positioner mounting system, comprising:
   a control valve assembly including a control valve actuator connected to a control valve by an actuator stem;
   a control valve positioner including an attachment lever; and
   a control valve positioner attachment system including an attachment arm fixed to the actuator stem,
      a spring loaded attachment on the attachment arm, the spring loaded attachment having a spring on the attachment arm and applying force from the spring to the attachment lever of the control valve positioner to affix the spring loaded attachment to the attachment arm,
      whereby movement of the attachment arm is imparted to the attachment lever by the spring loaded attachment.

2. The mounting system of claim 1, wherein the spring loaded attachment includes a pair of bushings positioned on opposing sides of the attachment lever.

3. The mounting system of claim 2, wherein the spring force is applied to the attachment lever by one of the pair of bushings biased in the direction of the bushing on the opposing side.

4. The mounting system of claim 3, wherein the spring force is applied in a closed force circuit by anchoring the spring applying the spring force such that the spring force the applied to the attachment lever.

5. The mounting system of claim 2, wherein the attachment lever includes a pair of parallel bars and the pair of bushings are mounted to a bushing support bar positioned between the parallel bars.

6. The mounting system of claim 5, wherein the bushing support bar is slidably mounted between the parallel bars such that the bushing support bar can slide along the length of the attachment lever.

7. The mounting system of claim 5, wherein each bushing of the pair of bushings includes a sloping face on a face proximate to the opposing bushing such that the spring force applied to the parallel bars is consistent independent of wear on the pair of bushings.

8. The mounting system of claim 2, wherein material forming the pair of bushings is electrically neutral to avoid sparking.

9. A control valve positioner, comprising mounting system:
   a control valve assembly including a control valve actuator connected to a control valve by an actuator stem;
   a control valve positioner;
   an attachment lever including a pair of parallel bar arms translating movement of the control valve to the control valve positioner; and
   a control valve attachment system for attaching the control valve assembly to the attachment lever using a spring loaded attachment on an attachment arm affixed to the control valve assembly and applying spring force to the parallel bar arms of the attachment lever wherein the force applied to a first parallel bar arm is the same as the force applied to a second parallel bar arm.

10. The mounting system of claim 9, wherein the spring loaded attachment includes a pair of bushings positioned on opposing sides of the attachment lever.

11. The mounting system of claim 10, wherein the spring force is applied to the attachment lever by one of the pair of bushings biased in the direction of the bushing on the opposing side.

12. The mounting system of claim 11, wherein the spring force is applied in a closed force circuit by anchoring a spring applying the spring force to one bushing of the pair of bushing such that the spring force is applied to the attachment lever.

13. The mounting system of claim 10, wherein the pair of bushings are mounted to a bushing support bar positioned between the parallel bars and the bushing support bar is slidably mounted between the parallel bars such that the bushing support bar can slide along the length of the attachment lever.

14. The mounting system of claim 10, wherein material forming the pair of bushings is Teflon.

15. The mounting system of claim 9, wherein each bushing of the pair of bushings includes a sloping face on a face proximate to the opposing bushing such that the spring force applied to the parallel bars is consistent independent of wear on the pair of bushings.

\* \* \* \* \*